No. 817,588. PATENTED APR. 10, 1906.
J. A. REISING.
WIRE CLAMP.
APPLICATION FILED APR. 13, 1905.

Witnesses
M. A. Schmidt.
Geo. E. Tew

Inventor
John A. Reising.
by Milo B. Stevens & Co.
Attorneys

UNITED STATES PATENT OFFICE.

JOHN A. REISING, OF AURORA, ILLINOIS.

WIRE-CLAMP.

No. 817,588.     Specification of Letters Patent.     Patented April 10, 1906.

Application filed April 13, 1905. Serial No. 255,328.

*To all whom it may concern:*

Be it known that I, JOHN A. REISING, a citizen of the United States, residing at Aurora, in the county of Kane and State of Illinois, have invented new and useful Improvements in Wire-Clamps, of which the following is a specification.

This invention is a clamp for connecting electrical conducting-wires.

It has for its particular object to form a connector which will not corrode or rust the wires even where iron wires are used. It is a defect of existing wire-connectors that they are, as a rule, made of brass or copper complete, and when connected with wires, particularly with iron wires, the latter corrode at the connection, which increases the electrical resistance and when used with telephones causes an objectionable buzzing, cracking, or similar noise.

My invention obviates to a great extent the corrosion or rusting by the use of a clamp having a lining of soft non-corrosive metal, such as lead, aluminium, solder, or Babbitt metal, or, preferably, a compound metal formed by combining lead and Babbitt, two parts lead to three parts Babbitt.

A further object of the invention is to produce devices which while having the features referred to above will have advantages in mechanical construction hereinafter pointed out.

Figure 1:
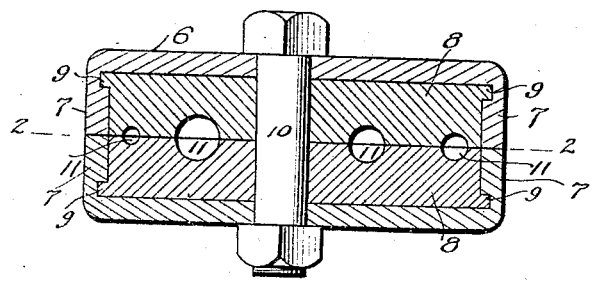
Figure 2:
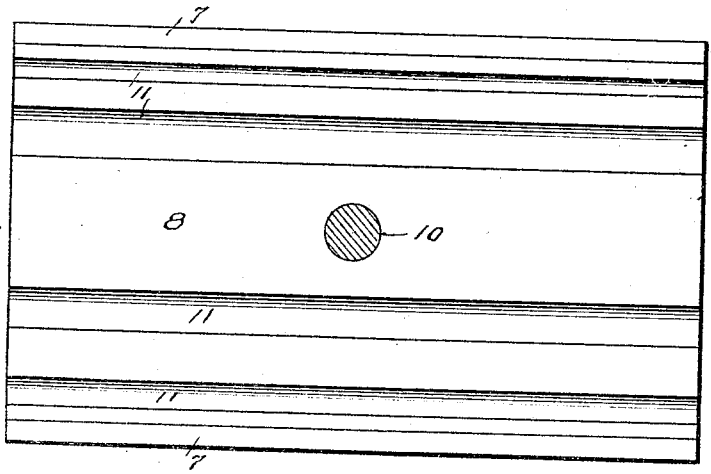
Figure 3:
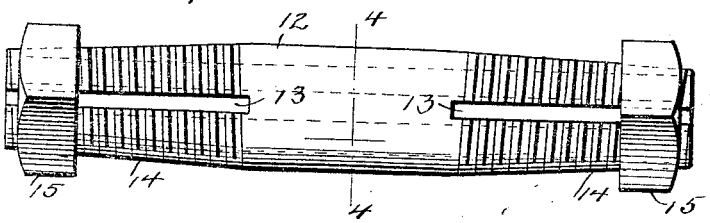
Figure 4:
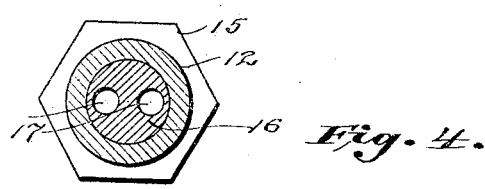

In the accompanying drawings, Figure 1 is a cross-section of a clamp. Fig. 2 is a horizontal section on the line 2 2 of Fig. 1. Fig. 3 is a side view of a modification. Fig. 4 is a cross-section on the line 4 4 of Fig. 3.

In the forms shown in Figs. 1 and 2, the clamp has two outer rigid metal plates, as indicated at 6. These plates are preferably made of sheet-copper cut in oblong pieces and pressed in shape to form two flanges 7 at the side edges to protect the lining and retain it in place. 8 indicates the lining or inner plates, which fit within the outer pieces and may be held therein by rivets, screws, or adhesion, or by lugs 9, projecting into suitable grooves or notches in the outside pieces. This latter connection is effected by melting the soft metal and casting it directly in place.

The two parts of the clamp thus formed are held together by a bolt 10, extending therethrough. The hole for this bolt is preferably offset a little from the middle, so that the edges will not match unless the parts are correctly set, which is advantageous in connecting wires of different sizes.

The faces of the lining-plates 8 have matching grooves 11 extending lengthwise thereof. These grooves are of different sizes and are made especially to fit different-sized wires, so as to allow the plates to fit snugly together in close contact when drawn up by the screw and at the same time have pressure enough to hold the wires in a tight and firm connection. When the entire wire is encircled by the soft metal, rust and corrosion is prevented. To this end the grooves are preferably made slightly—say one one-hundredth of an inch—less in depth than the radius of the wire which is to fit therein, so that when the pressure is applied the plates will draw up that much before coming together.

When iron and copper wires are connected with the same connector, the wires would soon corrode where the clamp is made of copper or brass, thereby loosening the connection, forming an electrical resistance and producing a noisy telephone. The use of a soft non-corrosive metal avoids it; but still it is essential that some stouter metal be used to support the lining or inner plates. The clamp therefore combines the strength of a rigid metal with the non-corrosive properties of a composite metal.

The use of the plurality of grooves of different sizes, as shown in Fig. 1, allows two or more connections, as for connecting two telephones to the same wire, which is very often desirable when placing such telephones in the same or adjacent buildings on party-lines, and when so connected one telephone can be disconnected without removing the other.

The construction shown in Figs. 3 and 4 is particularly suitable for connecting wires end to end. The clamp comprises an outer tube 12, preferably formed of comparatively stout rigid metal, such as brass, slotted at the ends, as at 13. The ends are also tapered and threaded, as at 14, to receive taper nuts 15 for compression at each end. This tube is lined with soft composite metal 16, having extending lengthwise therethrough two holes 17 for the meeting ends of the wires, which are passed into the respective holes from opposite ends, after which by tightening the nuts the soft metal is contracted and clamped tightly against and around the ends of the wire, thereby firmly connecting the same and also preventing corrosion of the wires, as hereinbefore referred to.

What I claim as new, and desire to secure by Letters Patent, is—

1. A wire-connector, comprising opposite plates having a lining of soft metal grooved to receive wires, and means to clamp the plates together.

2. A wire-connector, comprising opposite plates having a lining of non-corrosive metal grooved to receive wires, and means to clamp the plates together.

3. A wire-connector, comprising outer plates of comparatively rigid metal, and inner plates of soft metal grooved to receive wires and compressible to join their faces and entirely encircle the wires, and means to clamp the plates together.

4. A wire-connector, comprising an outer tube tapered, split and threaded at the ends, a lining of soft non-corrosive metal in the tube, having holes to receive the ends of wires, and nuts on the threaded ends of the tube.

5. A wire-connector, comprising a pair of similar outer plates of comparatively rigid metal, each of which is shaped to form two flanges at its side edges, and has a lining of soft metal secured thereto and fitting between the flanges, the linings having matching grooves extending from end to end thereof.

In testimony whereof I have signed my name to this specification in the presence of two subscribing witnesses

JOHN A. REISING.

Witnesses:
  HENRY NERTHREL,
  WARREN SHEFFER.